United States Patent [19]

McColgan et al.

[11] Patent Number: 5,557,467
[45] Date of Patent: Sep. 17, 1996

[54] COMBINATION REARVIEW MIRROR

[75] Inventors: Christopher McColgan, Quebec; Andrew J. Rolph, Ottawa, both of Canada

[73] Assignee: The Lanechanger, Inc., Aylmer, Canada

[21] Appl. No.: 502,738

[22] Filed: Jun. 30, 1995

Related U.S. Application Data

[63] Continuation of Ser. No. 191,623, Feb. 4, 1994, abandoned, which is a continuation-in-part of Ser. No. 63,357, May 17, 1993, abandoned, which is a continuation of Ser. No. 852,958, Mar. 17, 1992, abandoned, which is a continuation-in-part of Ser. No. 685,872, Apr. 16, 1991, Pat. No. Des. 335,857, and a continuation-in-part of Ser. No. 754,678, Sep. 4, 1991, abandoned.

[30] Foreign Application Priority Data

Sep. 7, 1990 [CA] Canada .................................. 2024846

[51] Int. Cl.$^6$ .............................. G02B 5/08; G02B 7/182; B60R 1/04
[52] U.S. Cl. ........................ 359/605; 359/606; 359/838; 359/864; 359/865; 248/476; 248/480
[58] Field of Search ........................ 359/838, 850, 359/854, 855, 864, 865, 866, 868, 877, 603, 604, 605, 606; 248/476, 477, 480; 33/264

[56] References Cited

U.S. PATENT DOCUMENTS

| Re. 17,274 | 4/1929 | Porter | 359/838 |
|---|---|---|---|
| 1,311,253 | 7/1919 | Stern | 359/838 |
| 2,514,989 | 7/1950 | Buren | 359/866 |
| 3,028,794 | 4/1962 | Kinkella | 359/866 |
| 3,375,053 | 3/1968 | Ward | 359/864 |
| 3,667,833 | 6/1972 | Baldwin, Sr. | 359/864 |
| 4,023,029 | 5/1977 | Fischer | 359/838 |
| 4,245,894 | 1/1981 | Luchtenburg | 359/866 |
| 4,345,819 | 8/1982 | Villa-Rual | 359/865 |
| 4,449,786 | 5/1984 | McCord | 359/868 |
| 4,674,850 | 6/1987 | Blom | 359/851 |
| 4,917,485 | 4/1990 | Baldwin, Sr. | 359/866 |

FOREIGN PATENT DOCUMENTS

| 2148022 | 3/1973 | Germany | 359/838 |
|---|---|---|---|
| 4040839 | 6/1992 | Germany | 359/864 |

*Primary Examiner*—Ricky D. Shafer
*Attorney, Agent, or Firm*—Notaro & Michalos

[57] ABSTRACT

A rearview mirror assembly for a vehicle comprising a first planar reflective surface, a second longitudinally convex reflective surface providing a wider field of rearward vision relative to the first reflective surface, the convex surface additionally curving downwardly at its opposite ends in a direction towards the planar reflective surface, a frame surrounding the first and second reflective surfaces for maintaining the same in a position in parallel longitudinal alignment with one another, markings adjacent the second reflective surface providing a visual indication of a safe lane changing zone and a slider for translating side-to-side movements thereof into back-and-forth movements of the first planar reflective surface.

10 Claims, 7 Drawing Sheets

COMBINATION REARVIEW MIRROR

This application is a continuation of application Ser. No. 08/191,623, filed on Feb. 4, 1994, now abandoned, which is a continuation-in-part of application Ser. No. 08/063,357, filed on May 17, 1993, now abandoned, which is a continuation of application Ser. No. 07/852,958, filed on Mar. 17, 1992, now abandoned, which is a continuation-in-part of application Ser. No. 07/685,872, filed on Apr. 16, 1991, now U.S. Pat. No. D335,857, and of application Ser. No. 07/754,678, filed on Sep. 4, 1991, now abandoned.

FIELD OF THE INVENTION

The present invention relates to a rearview mirror for a vehicle and more particularly to a rearview mirror combining a flat and a convexly curved reflective surface to provide, in combination, an enhanced field of rearward vision.

BACKGROUND OF THE INVENTION

Conventional rearview mirrors provided on the windshield of virtually every new vehicle sold in North America typically include a single flat rearwardly reflective surface providing an undistorted but limited field of view to the vehicle's rear. This therefore results in the so-called "blind spots" to either side of the vehicle's flanks where the driver checking his mirror cannot see other vehicles. Shoulder checking is the only means of confirming that the blind spots are empty of vehicles, making it safe to change lanes. Shoulder checking requires the driver to take his eyes off the road and is itself therefore somewhat hazardous.

Various mirror constructions have been proposed to overcome the limitation of conventional mirrors but most of these efforts have failed due either to a cumbersome structure, excessive distortion of the field of view, cost, poor ergonomics and poor aesthetics. Perhaps as importantly, mirrors offering an enhanced rearward field of view are not as yet widely offered as original equipment on new vehicles, which, if they were, would lend greater credibility to the use of these devices for enhanced vehicle safety. Moreover, a large part of the reason such mirrors are not offered as original equipment from manufacturers is the lack of a suitable product which overcomes the deficiencies of known after-market products.

SUMMARY OF THE INVENTION

Accordingly, it is an object of the present invention to provide an improved combination rearview mirror which obviates and mitigates from the disadvantages of the prior art.

According to the present invention, then, there is provided a rearview mirror for a vehicle comprising a first planar reflective surface, a second longitudinally convex reflective surface providing a wider field of rearward vision relative to the first reflective surface, the second convex reflective surface additionally curving downwardly at its opposite ends in a direction towards the first reflective surface, a frame surrounding the first and second reflective surfaces for maintaining the second reflective surface in a fixed position above the first reflective surface, and markings adjacent the second reflective surface providing a visual indication of a safe lane changing zone.

BRIEF DESCRIPTION OF THE DRAWINGS

Preferred embodiments of the invention will now be described in greater detail, and will be better understood when read in conjunction with the following drawings in which.

DETAILED DESCRIPTION

Figure 1:
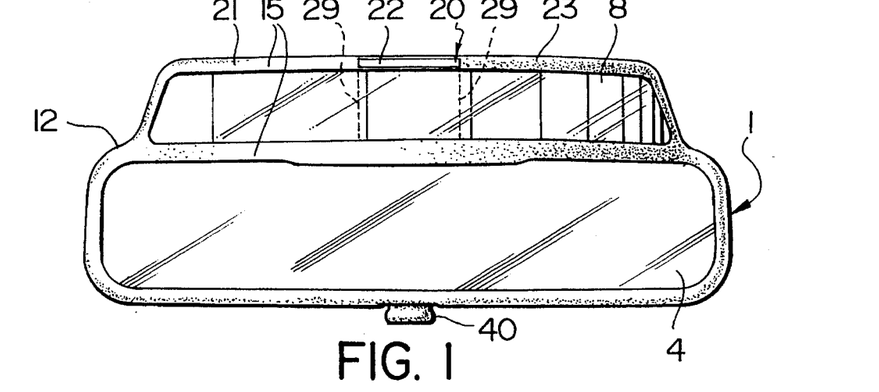
FIG. 1 is a front elevational view of the present mirror.
Figure 2:
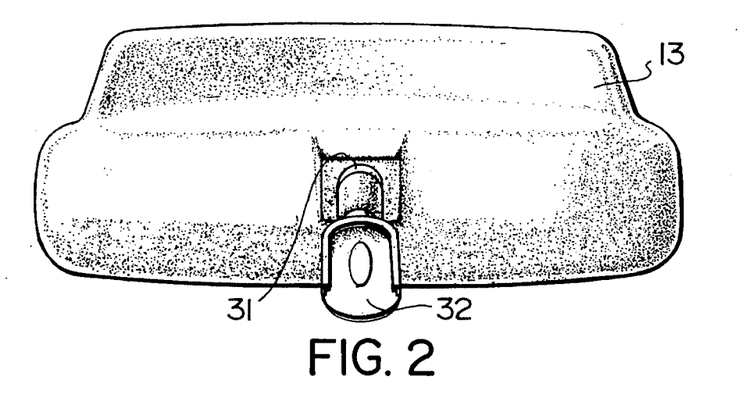
FIG. 2 is a rear elevational view of the mirror of FIG. 1.
Figure 3:
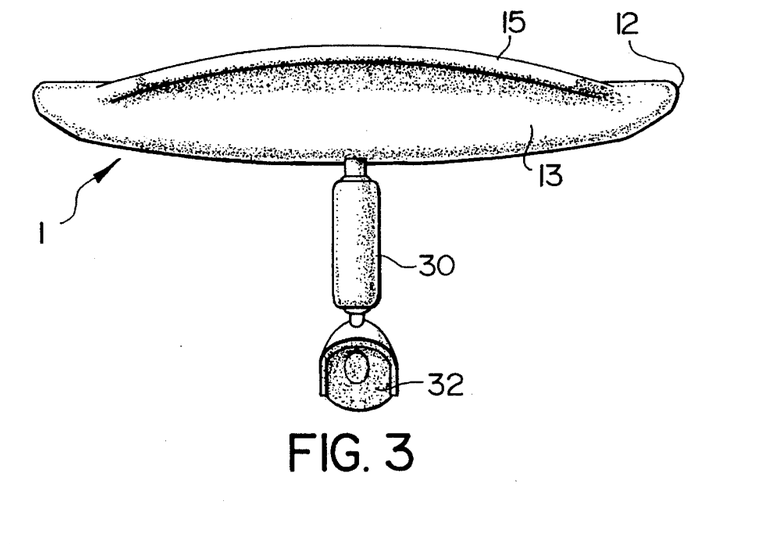
FIG. 3 is a top plan view of the mirror of FIG. 1.
Figure 4:
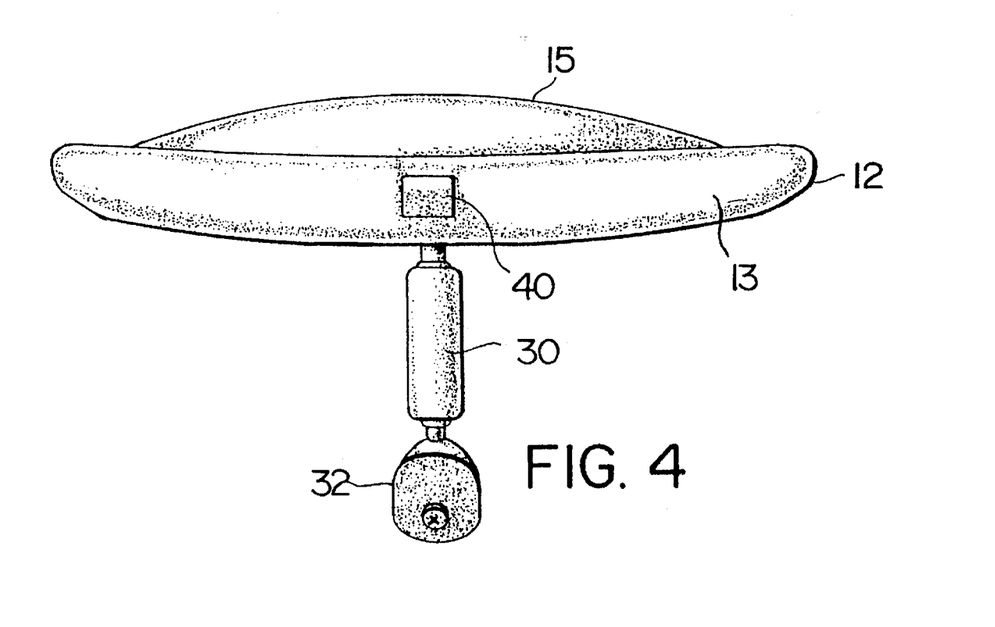
FIG. 4 is a bottom plan view of the mirror of FIG. 1.
Figure 5:
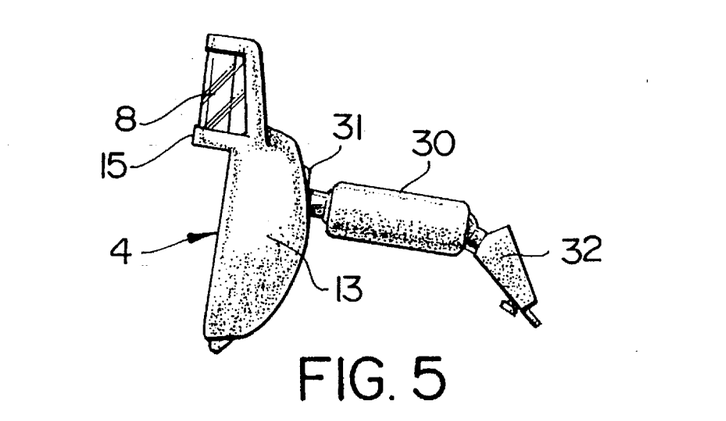
FIG. 5 is a side elevational view of an end of the mirror of FIG. 1.

With reference now to FIG. 1, present mirror 1 combines a conventional first flat reflective surface 4 and a second longitudinally convex reflective surface 8. Mirror 4 provides the usual undistorted but limited field of rearward vision whereas mirror 8, being convex, provides a much wider rearward field of vision which overlaps to both sides with most persons natural peripheral vision, thereby all but eliminating the blind spots in the field of view afforded by mirror 4 alone.

Surrounding both of mirrors 4 and 8 is a frame 12 including a backing 13 and relatively thin raised edges 15 which overlap the adjacent edges of mirrors 4 and 8 to retain the mirrors firmly in place in fixed positions relative to each other. As shown, both mirrors as retained by frame 12 are in parallel longitudinal alignment with mirror 8 preferably, but not necessarily, located vertically above mirror 4.

Frame 12 is formed integrally about both mirrors to provide a unitary, seamless, aesthetically pleasing appearance while at the same time making the mirror as a whole compact, unobtrusive, easy to adjust and rigid. As shown, to provide a relatively low profile, the vertical height of mirror 8 is less than that of mirror 4.

As is known, convex mirrors tend to distort distances, making objects appear further away than they really are. It is important therefore that some means be provided to provide a visual indication of which vehicles appearing in the mirror's field of vision are sufficiently distant to permit a safe lane change.

This is accomplished in the present invention by means of calibrated scale 20 marked on frame 12 either above or below mirror 8. Scale 20 is sub-divided into visually distinct zones 21, 22 and 23 distinguished from one another such as by means of colour, texture or some other form of marking. In one embodiment constructed by the applicant, zones 21 and 23 are coloured red, whereas zone 22 is white, both of which colours contrast with the typically dark plastic or resinous material of frame 12. Any vehicle appearing in mirror 8 beneath zones 21 and 23 is too close to permit a safe lane change. Any vehicle appearing in mirror 8 beneath white zone 22 is usually sufficiently distant to permit a safe lane change, subject to the usual considerations such as road conditions, weather, the other vehicle's speed of approach and of course the level of traffic.

Scale 20 may be marked on mirror surface 8 itself, or the mirror may be sub-divided by means of thin vertical lines 29 (shown in dotted lines) separating the safe and not-safe lane changing zones in the field of vision. Another alternative is to tint the not-safe zones a different colour relative to the safe zone.

In other respects, mirror 1 is conventional in construction and includes the usual post 30 with a ball joint 31 at one end to provide full adjustability of the mirror's angle relative to the driver's eyes and a foot 32 at the other end for attachment to the car's windshield.

As with most conventional mirrors, the mirror may also include a day/night switch 40.

Figure 6:
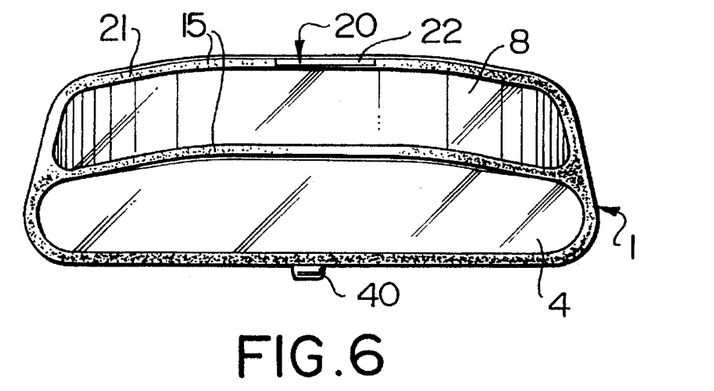
FIG. 6 is a front elevational view in a modified version of the present mirror.
Figure 7:
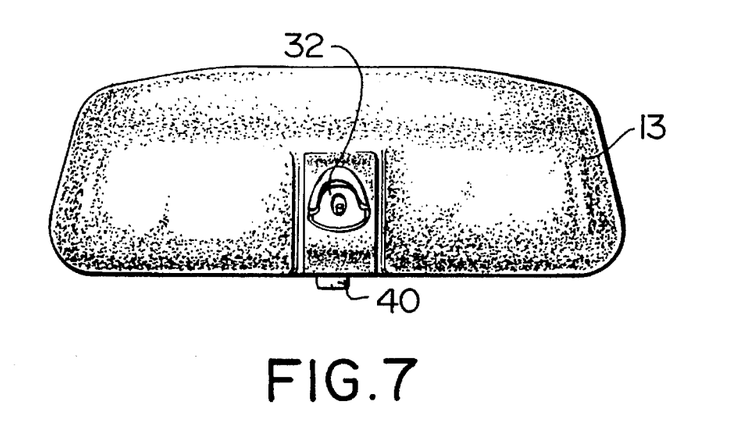
FIG. 7 is a rear elevational view of the modified mirror of FIG. 6.
Figure 8:
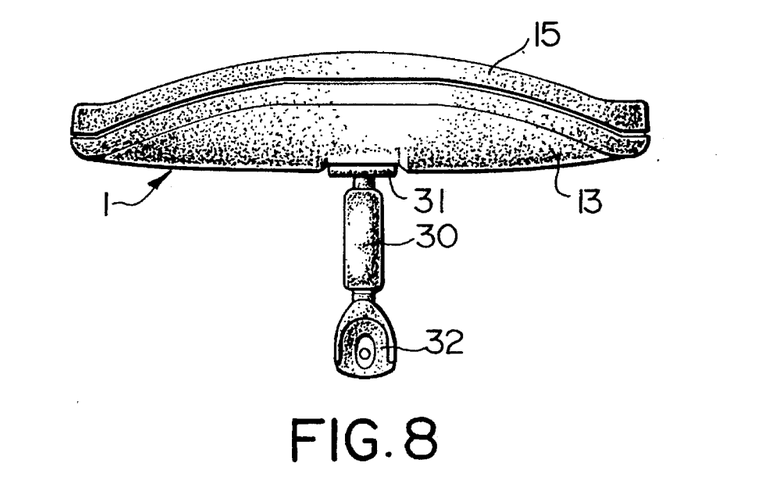
FIG. 8 is a top plan view of the modified mirror of FIG. 6.
Figure 9:
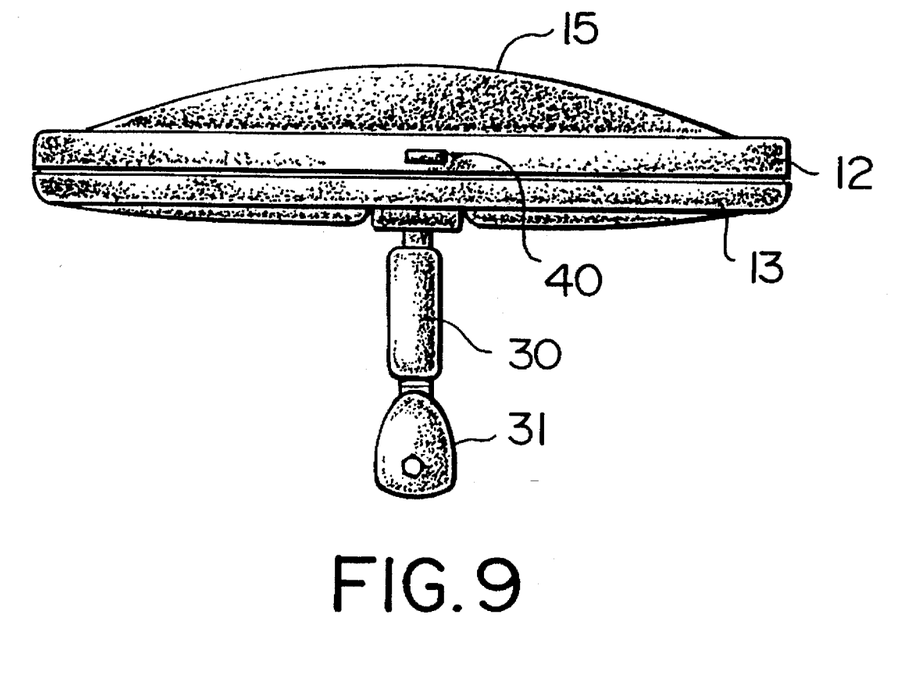
FIG. 9 is a bottom plan view of the modified mirror of FIG. 6.
Figure 10:
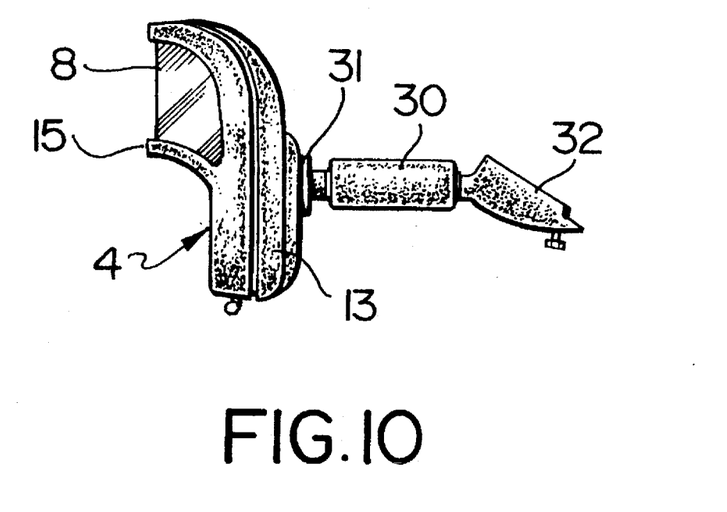
FIG. 10 is a side elevational view of an end of the modified mirror of FIG. 6.

FIG. 6 illustrates a further modification in a mirror combining both a flat and a convexly curved reflective surface which provides even more enhancement to the field of rearward view. More particularly, even the combination mirror of FIGS. 1 to 5 has some limitations primarily with respect to observing back seat passengers, such as children, and certain kinds of vehicles such as bicycles and motorcycles located in the blind spots or elsewhere that because of their reduced height and width compared to conventional cars and trucks, are more easily missed. Accordingly, it is advantageous to provide not only enhanced rearward vision in the horizontal plane, but also in the vertical plane, primarily for the purpose of looking downwardly towards rear seat passengers and lower profile vehicles behind or beside the driver. Although a spherical lens can provide an enhanced vertical field of view, this is accomplished at a cost of unacceptable levels of distortion, particularly if the driver first uses the flat lens, and is then almost disoriented by glancing into a spherical lens. Moreover, the time required to interpret the distorted image visible in a spherical lens is too long for the driver to remove his/her gaze from the road, particularly in heavy or fast-removing traffic conditions.

With reference to FIGS. 6 to 10, there is shown a modified combination mirror in which the same reference numerals as used in FIGS. 1 to 5 have been used to identify like elements. As will be seen particularly from FIG. 6, upper lens 8, in addition to curving rearwardly to provide a convexity, also curves downwardly at its opposite ends to emulate a "droop" at its ends. This droop has been found to provide enhanced rearward vision in the vertical plane without the excessive distortion associated with a spherical lens. The droop therefore allows children located in the vehicle's rear seat to be readily observed and also to facilitate better sighting of bicycles, scooters and motorcycles particularly in the driver's blind spots. If desired, lens 8 can be imparted with a slight spherical curvature in the vertical plane.

In other respects, the mirrors of FIGS. 1 and 6 are much the same, although the relative height of mirrors 4 and 8 in the embodiment of FIG. 6 are more nearly equal.

FIGS. 11 to 15 illustrate yet another embodiment in a mirror combining both a flat and a convexly curved reflective surface. This modification is intended to further reduce the distortion in the rearward image provided by the convex lens and to provide day/night capability for the lower flat lens. In FIGS. 11 to 15, like reference numerals have been used to identify like elements corresponding to those appearing in FIGS. 1 to 10.

Figure 11:
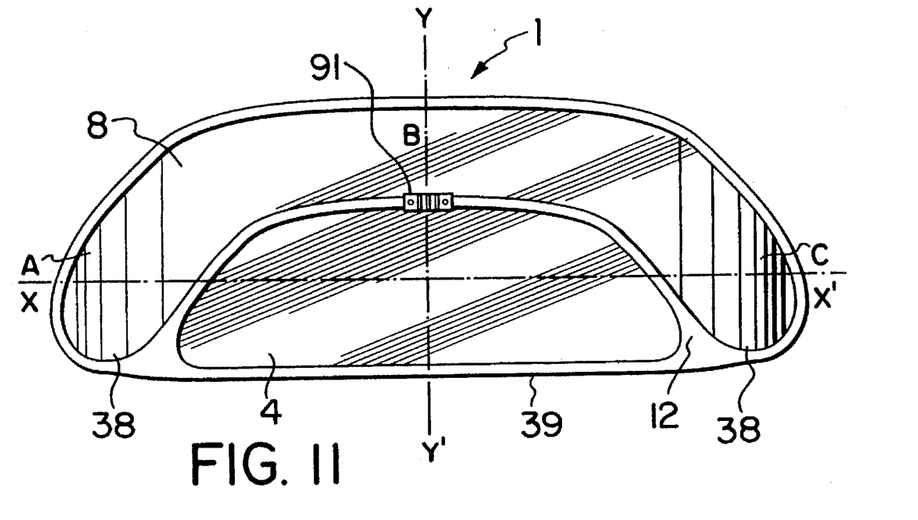
FIG. 11 is a front elevational view of a further modified version of the present mirror.

With reference to FIG. 11, mirror 1 is shown to include upper lens 8 which once again in addition to curving rearwardly also curves downwardly at its opposite ends for enhanced rearward vision in the vertical plane. In this particular instance, the magnitude of the droop has been increased so that the ends 38 of lens 8 are nearly co-terminus with the lower edge 39 of lens 4.

It has been found that distortion in the image generated by lens 8 can be further minimized by varying the lens' radius of curvature progressively from a point A to the left in FIG. 11 to midpoint B and then symmetrically back to point C to the right in FIG. 11.

Figure 12:
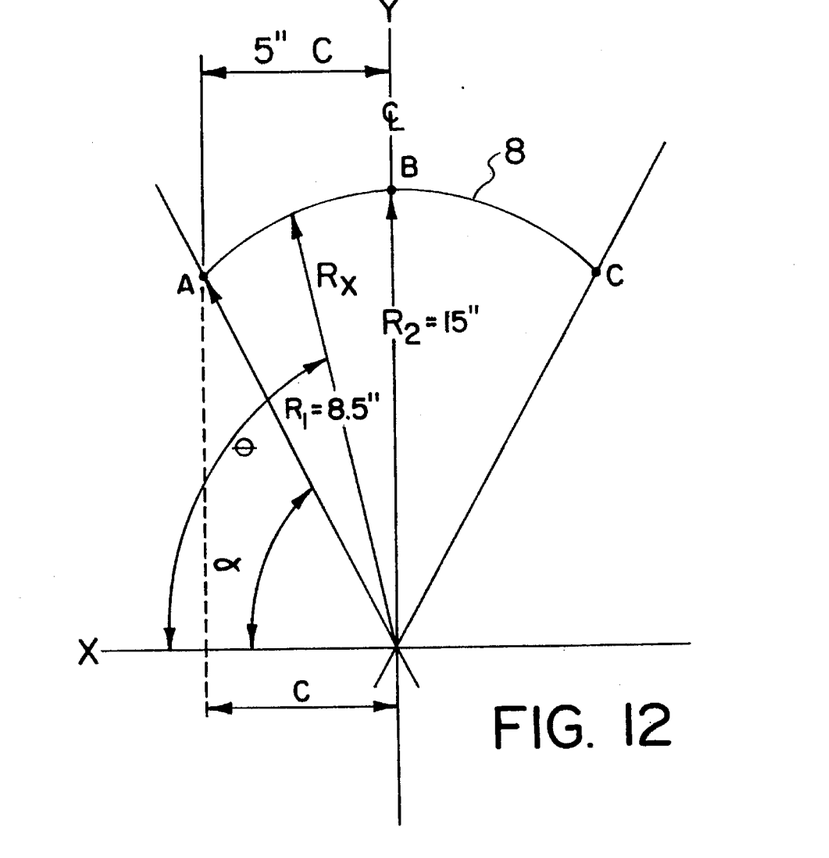
FIG. 12 is a cross-sectional view of the mirror of FIG. 11 along the line X—X'.

With reference to FIG. 12 representing a cross-sectional view through lens 8 along the line X—X', the orthogonal distance C between points A and B is, for purposes of illustration only, five (5) inches. At point A, the radius of curvature $R_1$ is advantageously 8.5 inches. At midpoint B, the radius of curvature $R_2$ is advantageously 15 inches. The radius of curvature $R_x$ between $R_1$ and $R_2$ advantageously increases linearly from $R_1$ to $R_2$ and decreases with symmetrical linearity from point B to point C. Thus, using polar coordinates, the curvature of lens 8 as a function of $R_x$ from point A to point B is governed by the formula:

$$R_x = \frac{2(b-a)\theta + a\pi - 2\alpha b}{\pi - 2\alpha} \qquad (1)$$

where:

$a = R_1$ $b = R_2$ c = the distance between points A and B and along the x co-ordinate.

$\theta$ is the angle (in radians) between $R_x$ and the x co-ordinate.

$\alpha = \arccos(c/a)$

Figure 13:
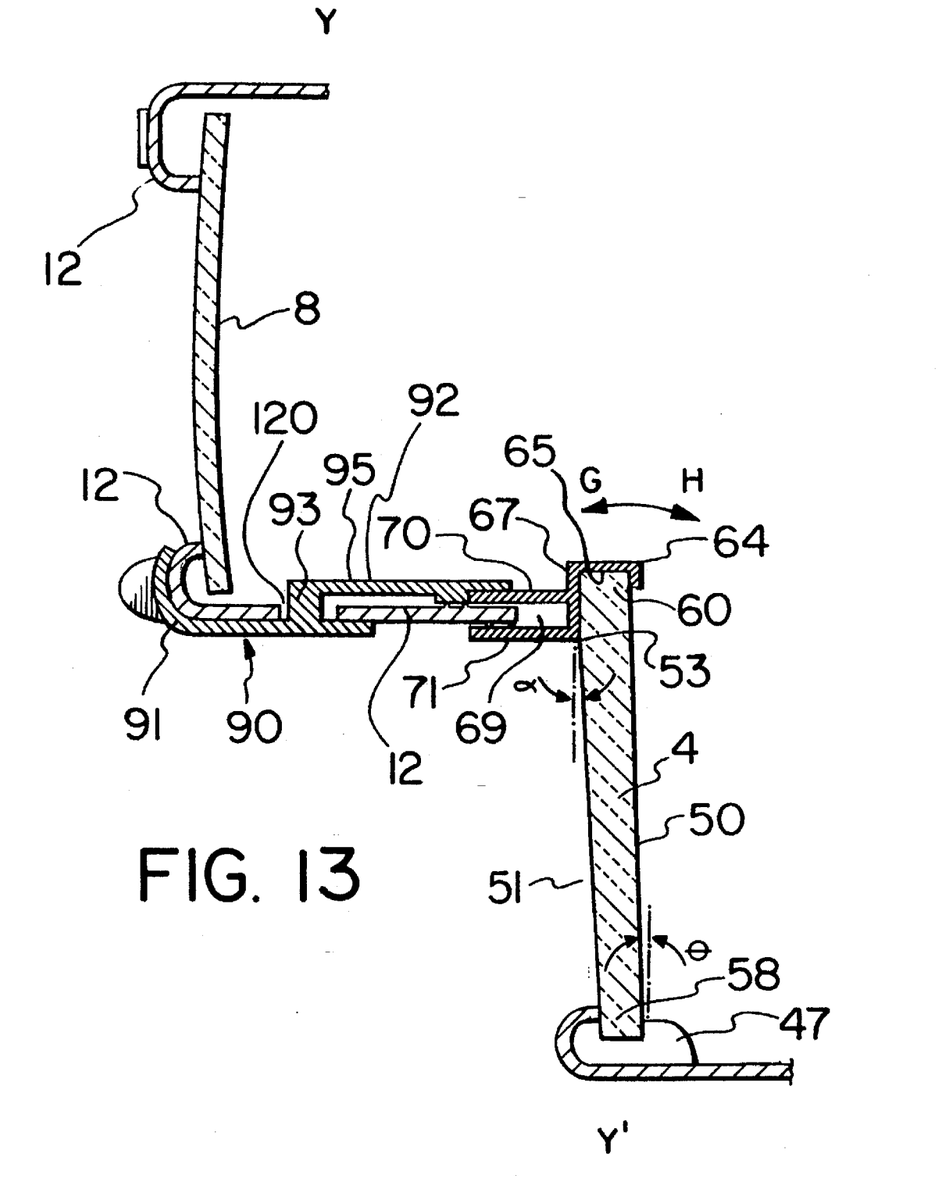
FIG. 13 is a cross-sectional view of the mirror of FIG. 11 along the line Y—Y'.

As will be appreciated, it is not practical to physically move frame 12 to adjust lower lens 4 for day/night driving conditions as obviously this will result in a corresponding movement of curved lens 8. Preferably therefore the day/night adjustment is made by physically moving lens 4 itself through a predetermined angle of deflection. With reference to FIG. 13, which is a cross-sectional view of the mirror taken through line Y—Y' (FIG. 11), and FIG. 14, upper curved lens 8 is fixedly mounted into frame 12 in any standard way. Lower lens 4 is formed from a prismatic glass blank including a silvered rear surface 50 and a plain forward or front surface 51 which tapers relative to rear surface 50 commencing at point 53 at an angle $\alpha$ of, for example, 3.25°. Lower edge 58 of lens 4 is held in place against frame 12 by first means such as a resilient glazing molding 47 so that edge 58 can pivot slightly relative to the frame. The upper edge 60 of lens 4 is received into second means such as a molding member 64 including a lens receiving channel 65, a web surface 67 and a pair of forwardly extending flanges 70 and 71 defining a slot 69 therebetween. An orthogonally extending diagonally disposed lug 72 is provided on an upper surface of flange 70, that, in cooperation with a slot 80 forming part of a slide switch 90, allows upper edge 60 of lens 4 to be deflected backwardly and forwardly by a predetermined angle θ as will now be described in greater detail.

Slide switch 90 includes a slider 91 and an attachable bracket 92, the bracket including a first leg 93 and a contiguous second leg 95 having slot 80 formed therein. For improved aesthetics, slider 91 is molded to fit concentrically over frame 12 as best seen in FIGS. 13 and 15. Leg 93 passes through a slot 120 in frame 12 so that switch 90 can be moved from side to side as indicated by arrow F in FIGS. 14 and 15. Slot 80 slidably engages lug 72 so that as switch is moved to the right in FIG. 14, lug 72 and molding 64 will be pulled forwardly in the direction of arrow G. In this position, silvered surface 50 of lens 4 will be aligned generally orthogonally to the field of view for maximum daytime reflection. Daytime status can be visually indicated to the user by, for example, having a representation of the sun printed onto frame 12 appear through apertures 96 formed in slider 91.

Figure 14:
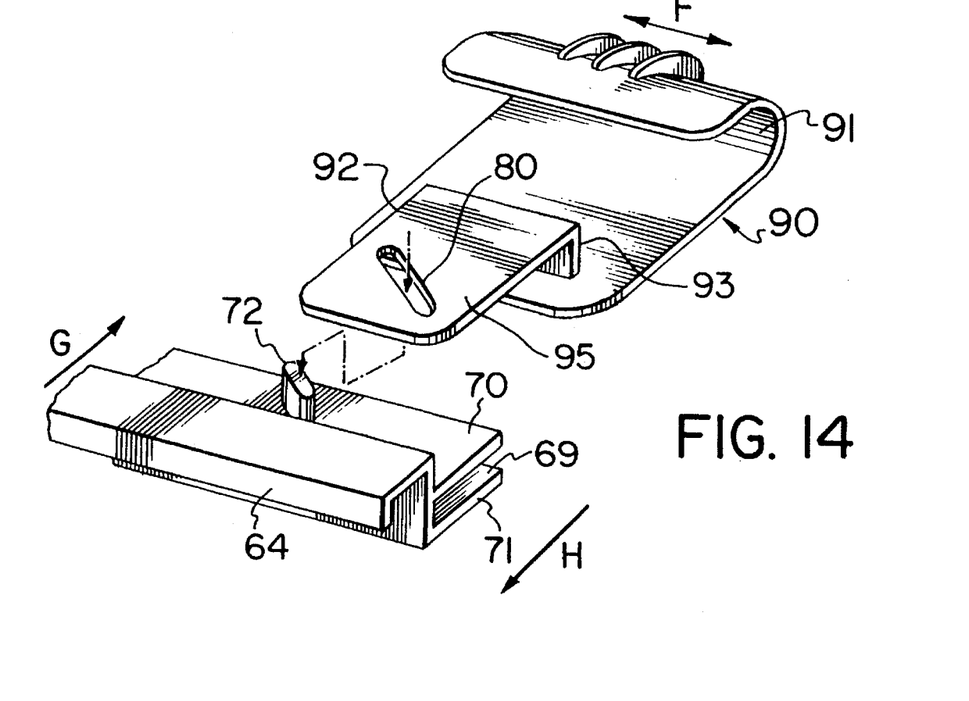
FIG. 14 is a perspective, partially sectional view of a switch mechanism for the mirror of FIG. 11.
Figure 15:
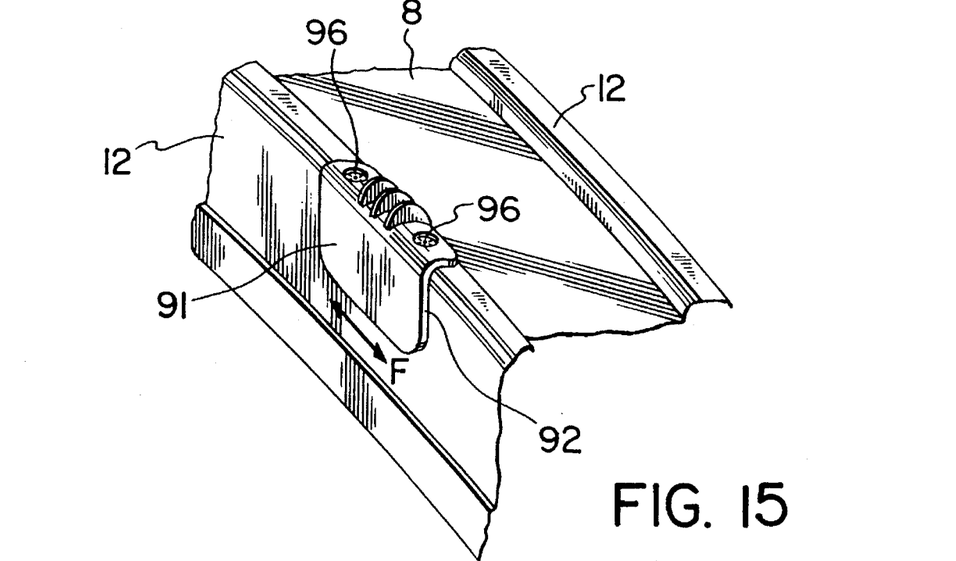
FIG. 15 is a lower perspective view of a portion of the mirror of FIG. 11.

Moving switch 90 to the left in FIG. 14 will push molding 64 rearwardly relative to frame 12 in the direction indicated by arrow H, whereby plain surface 51 of lens 4 will now be aligned orthogonally to the field of view for minimum nighttime reflection. A visual indication of this status is provided by having a representation of, for example, the moon and stars, appear through the apertures in slider 91.

The above-described embodiments of the present invention are meant to be illustrative of preferred embodiments and are not intended to limit the scope of the present invention. Various modifications, which would be readily apparent to one skilled in the art, are intended to be within the scope of the present invention. The only limitations to the scope of the present invention are set forth in the following claims appended hereto.

I claim:

1. A rearview mirror for a vehicle comprising:
   a first planar reflective surface having respective upper and lower edges;
   a second longitudinally convex reflective surface providing a wider field of rearward vision relative to said first reflective surface, said second convex reflective surface additionally curving downwardly at its opposite ends in a direction towards said first reflective surface;
   a frame surrounding said first and second reflective surfaces for maintaining the second reflective surface in a fixed position above said first reflective surface; and
   means for pivoting said first reflective surface to reduce high intensity reflections, said pivoting means comprising:
   first means for pivotally supporting one of said upper and lower edges;
   second means connected to the other of said upper and lower edges; and
   slider means provided on said frame and connected to said second means whereby said second means are moved towards or away from said frame in response to side-to-side movements of said slider means relative to said frame.

2. The mirror of claim 1 wherein said second means comprises a member for engaging said other edge of said first reflective surface, flange means extending from said member to cooperatively engage said frame for back-and-forth movement of said second means relative thereto and means for engaging said slider means that translate said side-to-side movement thereof into back-and-forth movements, respectively, of said second means.

3. The mirror of claim 2 wherein said means for engaging comprise a projection disposed on one of said slider means and said flange means and a slot in the other of said slider means and said flange means to slidable receive said projection therein, said slot being oriented at an angle relative to said first reflective surface wherein said side-to-side movements of said slider means result in said back-and-forth movements of said second means.

4. The mirror of claim 3 wherein said back-and-forth movements of said second means pivot said first reflective surface about said first means supporting said one edge thereof.

5. The mirror of claim 4 wherein said flange means comprise a pair of parallel flanges defining a slot therebetween for engaging an adjacent portion of said frame therein to guide said back-and-forth movement of said second means relative to said frame.

6. The mirror of claim 5 wherein the thickness of said first reflective surface decreases in the direction from said second means to said first means.

7. The mirror of claim 6 wherein the curvature of said second reflective surface, as a function of the radius of curvature $R_x$ thereof, being defined, in polar x-y coordinates, by the formula $$R_x = \frac{2(b-a)\theta + a\pi - 2\alpha b}{\pi - 2\alpha} \quad (1)$$

where $a=R_1$, $b=R_2$, $\alpha$=arc cos (c/a), c=the distance between points A and B along the x-co-ordinate where, and θ is the angle between $R_x$ and the x co-ordinate where $\alpha \leq \theta \leq \pi/2$.

8. The mirror of clam 1 wherein the curvature of said second reflective surface, as a function of the radius of curvature $R_x$ thereof, being defined, in polar x-y co-ordinates, by the formula:

$$R_x = \frac{2(b-a)\theta + a\pi - 2\alpha b}{\pi - 2\alpha} \quad (1)$$

where $a=R_1$, $b=R_2$, $\alpha$=arc cos (c/a), c=the distance between points A and B along the x-coordinate where, and θ is the angle between $R_x$ and the x coordinate where $\alpha \leq \pi/2$.

9. The mirror of claim 8 wherein a=8.5 inches, b=15 inches and c=5 inches.

10. The mirror of claim 1 additionally comprising markings adjacent said second reflective surface providing a visual indication of a safe lane changing zone.

\* \* \* \* \*